D. A. BIEBINGER.
TRACTOR PLOW.
APPLICATION FILED AUG. 24, 1912.

1,239,559.

Patented Sept. 11, 1917.
9 SHEETS—SHEET 1.

UNITED STATES PATENT OFFICE.

DAVID A. BIEBINGER, OF LA CROSSE, WISCONSIN, ASSIGNOR TO LA CROSSE PLOW COMPANY, OF LA CROSSE, WISCONSIN, A CORPORATION OF WISCONSIN.

TRACTOR-PLOW.

1,239,559.  Specification of Letters Patent. Patented Sept. 11, 1917.

Application filed August 24, 1912. Serial No. 716,925.

*To all whom it may concern:*

Be it known that I, DAVID A. BIEBINGER, a resident of La Crosse, in the county of La Crosse and State of Wisconsin, have invented certain new and useful Improvements in Tractor-Plows, of which the following is a full, clear, and exact description.

The invention relates to tractor-plows.

One object of the invention is to provide improved power-driven mechanism for consecutively raising and lowering the plows to cause them to commence and cease plowing in a transverse line, the plows being in a diagonal arrangement to cut adjoining furrows.

A further object of the invention is to provide improved draft-operated raising and lowering mechanism which is adapted to operate upon a lever and connections whereby the plows are locked in raised or lowered position, and forced from either of their alternative positions to the other.

The invention still further designs to improve the features of a plow, as hereinafter set forth.

The invention consists in the several novel features hereinafter set forth and more particularly defined by claims at the conclusion hereof.

In the drawings: Fig. 7 is a section taken on line 7—7 of Fig. 8. Fig. 8 is a detail view from the right side of one of the operating levers and parts carried thereby. Fig. 8ª is a section on line 8ª—8ª of Fig. 8.

Figure 1:
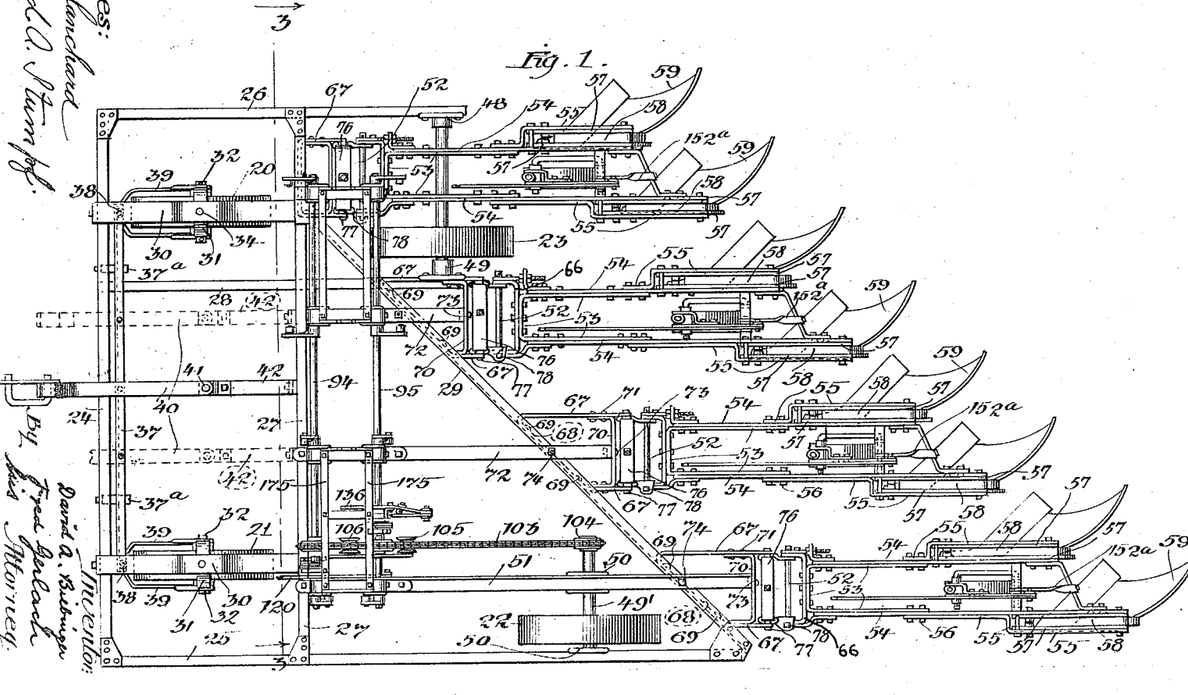
Figure 1 is a plan view of a plow embodying the invention.
Figure 2:
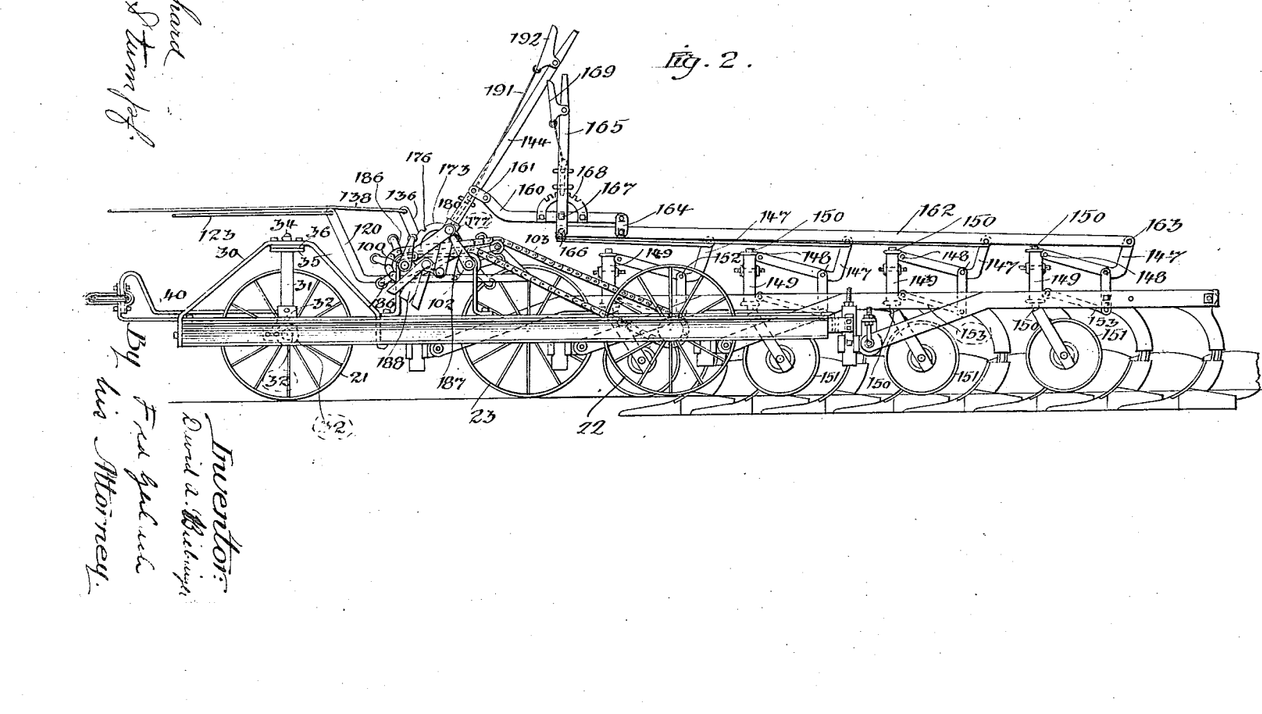
Fig. 2 is a side elevation.
Figure 3:
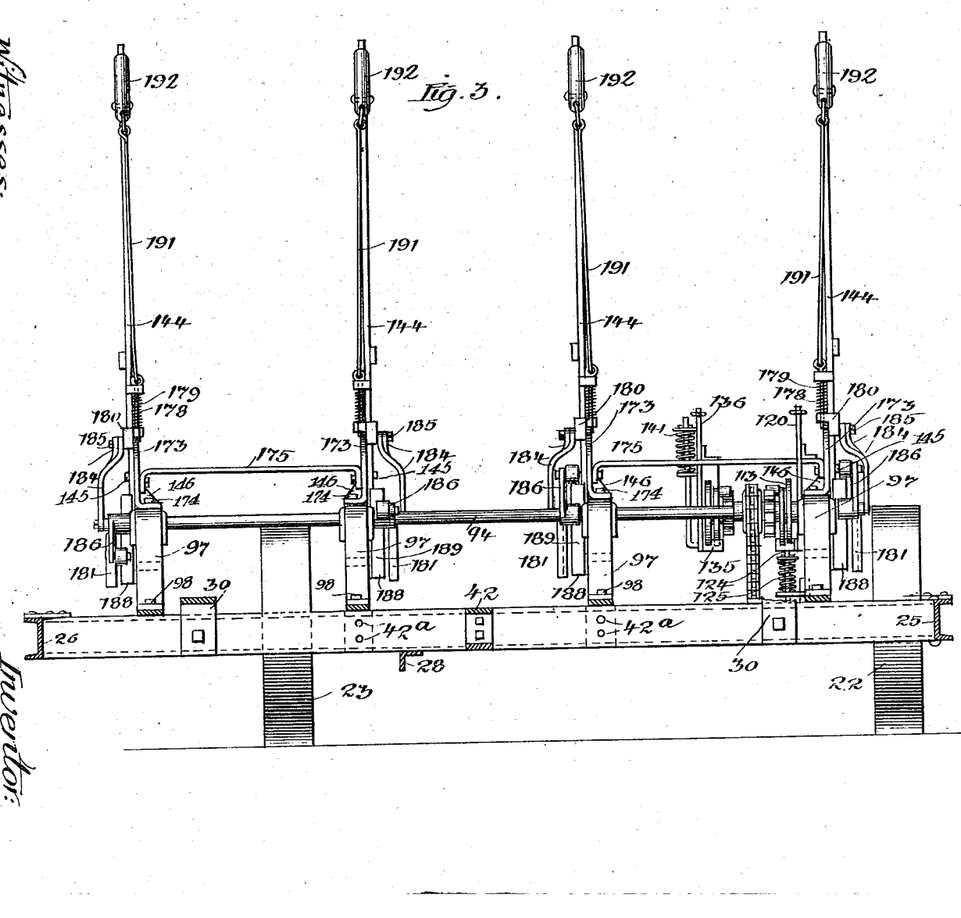
Fig. 3 is a section taken on line 3—3 of Fig. 1.

The improved plow comprises a supporting frame which is adapted to be hitched to a tractor and to be operated thereby. This supporting-frame is sustained by a pair of dirigible front-wheels 20 and 21, a traction-wheel 22 at the rear of one side of the frame, and a fourth wheel 23 at the rear of the other side of the frame. This frame comprises a front channel-bar 24, side-bars 25 and 26, a cross-bar 27, a longitudinally extending bar 28, and a diagonal rear-bar 29 which is secured to the rear end of side-bar 25. These cross-bars, side-bars and diagonal bar, are all rigidly secured together to constitute a supporting-frame for the plow-operating mechanism.

A draft-link 40 is connected by a pivot-pin 41 to a draft-bar 42 which is rigidly secured to cross-bars 24 and 27. Each of the wheels 20, 21 is journaled in a vertical fork 31 which is pivoted, at 34, in an arch bar 30. A fork 39 is secured to each fork 31 and a cross-bar 37 is pivoted, at 30, to the front ends of the forks 39. A pin 45 connects cross-bar 37 to the traction bar 40 to swing the dirigible wheels laterally, responsive to the movements of the draft-link 40.

Carrying-wheel 23 is mounted upon an axle 47 which is mounted in a bracket 48 which is secured to the rear end of frame-bar 26 and in a bracket 49 which is secured to a bar 67. Traction-wheel 22 is secured to a shaft 49' which is journaled in bearings 50 which are secured to frame-bar 25 and to a draft-bar 51, respectively.

Figure 11:
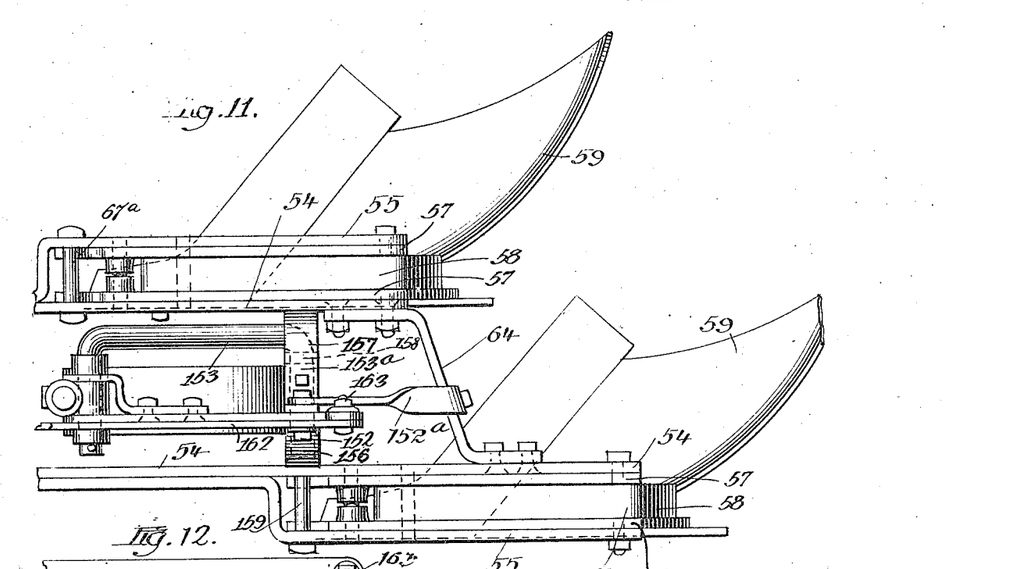
Fig. 11 is a plan of a pair of plow-beams and shares and connected parts.
Figure 12:
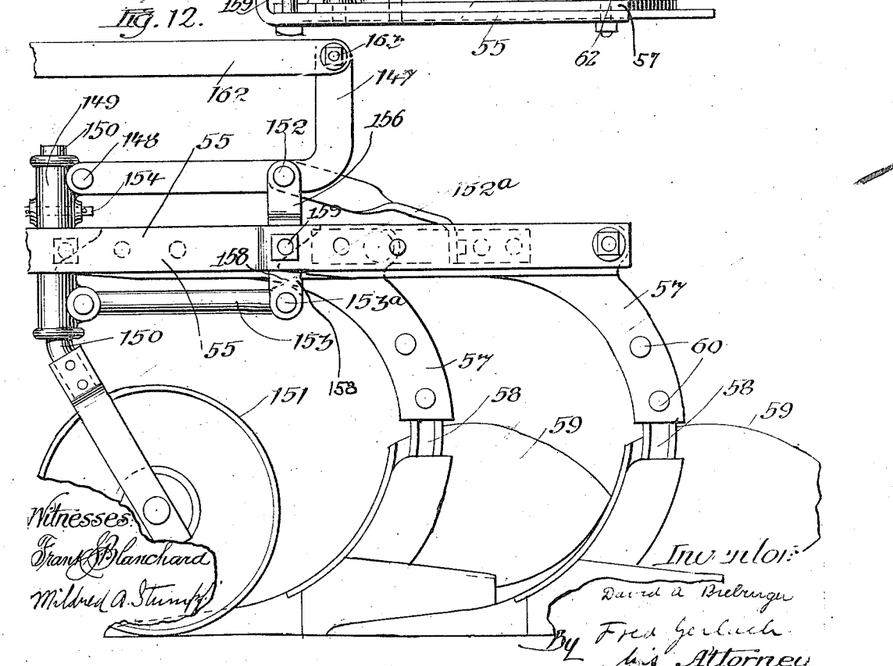
Fig. 12 is a side elevation of the same.

The plow illustrated comprises four pairs or gangs of plows which are mounted obliquely relatively to the line of travel and a separate raising and lowering connection is provided for each gang. The plow-supporting structures and operating-devices for these gangs are similar so that a description of one will be applicable to all. Each plow-carrying structure is pivotally connected at its front end by a pin 52 to permit the two beams connected thereto and the plows carried by said beams, to be raised out of and lowered into, the ground. These frames are made up of wrought metal bars to provide a strong and durable construction and each comprises a U-shaped bar 53 to each side of which a side-bar 54 is secured. To the outer side of each bar 54 the front end of a bar 55 is secured by bolts 56 which secure bars 53 and bars 54 and 55 together. The rear end of each bar 55 is bent away or spaced from its bar 54, and between each pair of bars 54 and 55 there is a pair of brackets 57 between which a plow-standard or beam 58, which carries a plow-share 59, is secured by bolts 60 a brace bar 64 connects the rear ends of bars 54.

A U-shaped bracket 66, through which the pin 52 extends, is secured to the front end of each frame-member 53.

The connection between pivot 52 and the main frame comprises a bar bent to form a pair of side-arms or members 67 and a connecting portion 68 which is shaped to fit into the channel in diagonal bar 29 and is secured thereto by rivets 69. A U-shaped bar 70, between arms 67, is secured thereto by rivets 71. Draft-bars 72 have their rear downturned ends, each secured by a rivet 73 to a bar 70 and are also bolted to the diagonal bar, as at 74, and to the cross-bar 27 at their front end. In this manner, these bars 72 serve as braces for the frame, as well as connections for the plow-frames. A bar 72 is provided for each of the inner gangs, and bar 51 serves as a draft-bar for the gang at one side, being similarly secured to bar 70 of that gang. An arch 76 is rigidly secured to the rear ends of the arms 67 by bolts 77, and lugs 78 are adjustably secured to said arch 76. The pin 52 passes through the lugs 78 and provides a pivotal connection between the plow-carrying structure and the frame.

The mechanism for operating the plows to raise and lower them is driven from traction-wheel 22 and comprises a cross-shaft 94 for operating the plow-connections to raise the plows and a cross-shaft 95 adapted to operate the plow-connections to lower the plows. These cross-shafts 94 and 95 are journaled in bearings 96 which are secured to brackets 97, the legs of which are bolted to the draft-bars of the main-frame, as at 98. Shaft 94, for operating the plow-connections to raise the plows, is adapted to be driven by means of a clutch 99 from a continuously driven sprocket-wheel 100, and cross-shaft 95 for operating the plow-connections to lower the plows, is driven by a clutch 101 which is operated by a continuously driven sprocket-wheel 102. Sprocket-wheels 100 and 102 are both driven by a sprocket-chain 103 which is driven by a sprocket-wheel 104 which is secured to the axle 49' of traction-wheel 22. This chain passes around sprocket-wheels 100 and 102 in such manner that the shafts driven thereby, respectively, will be rotated in opposite directions. A sheave 105 guides the upper reach of sprocket-chain 103. Sheave 105 is mounted at the end of an arm 107 which is pivoted to a lug 108, and a stud-and-slot connection 109 between said arm and a lug 110, permits adjustment of arm 107 to adjust sheave 105 to keep chain 103 taut. A sheave 106 is connected to arm 107 by a lug 111 to guide the reach of chain 103 between sprockets 100 and 102. By means of this mechanism, sprocket-wheels 100 and 102 and the clutch-members, respectively operated thereby, will be continuously driven while the plow is in operation.

Figure 6:
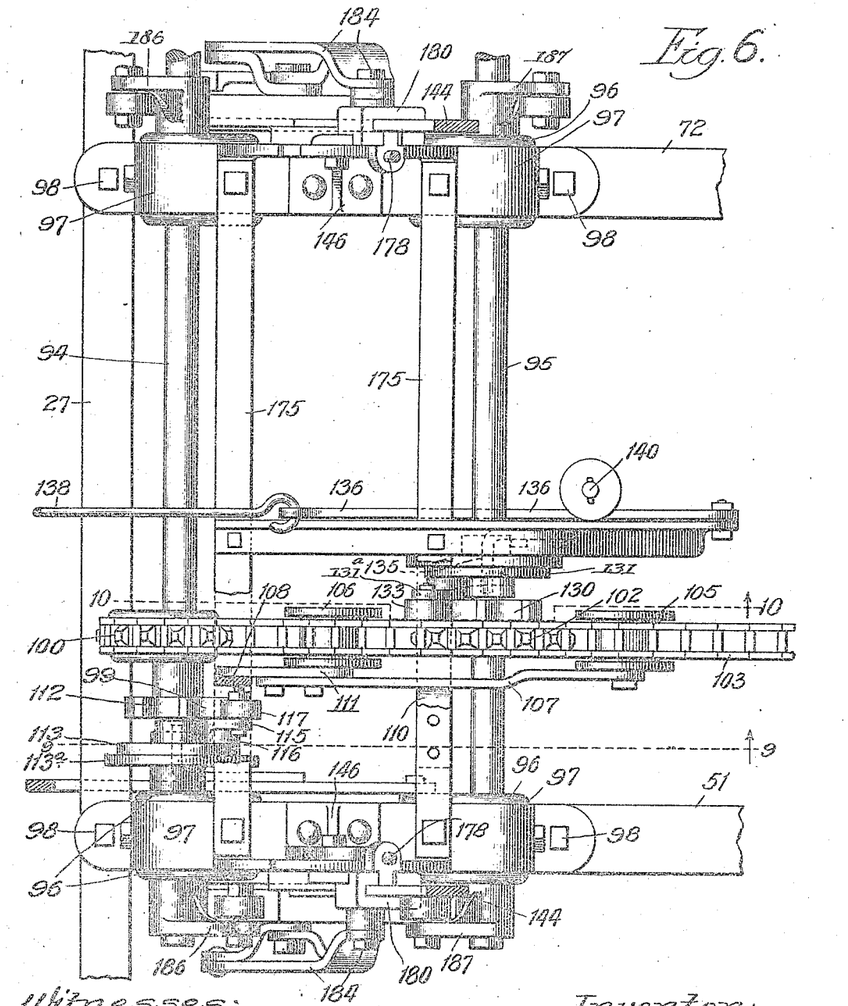
Fig. 6 is a plan view of Fig. 5.
Figures 7, 8, 8A:
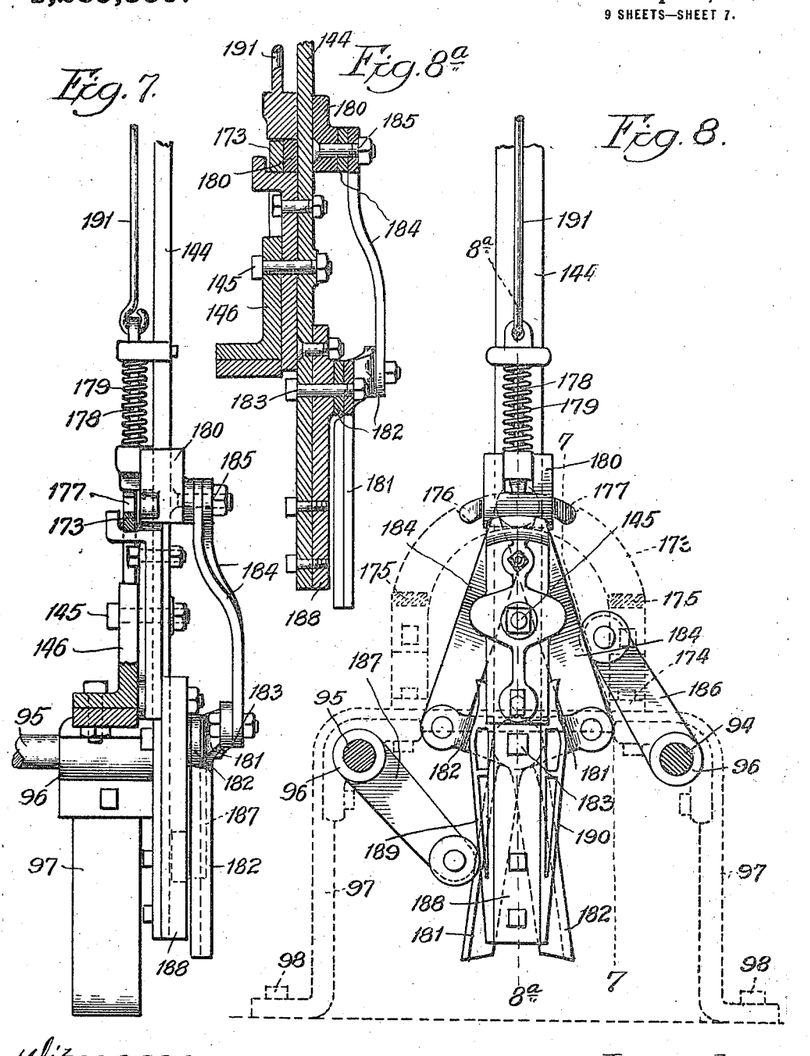
Figures 9, 10:
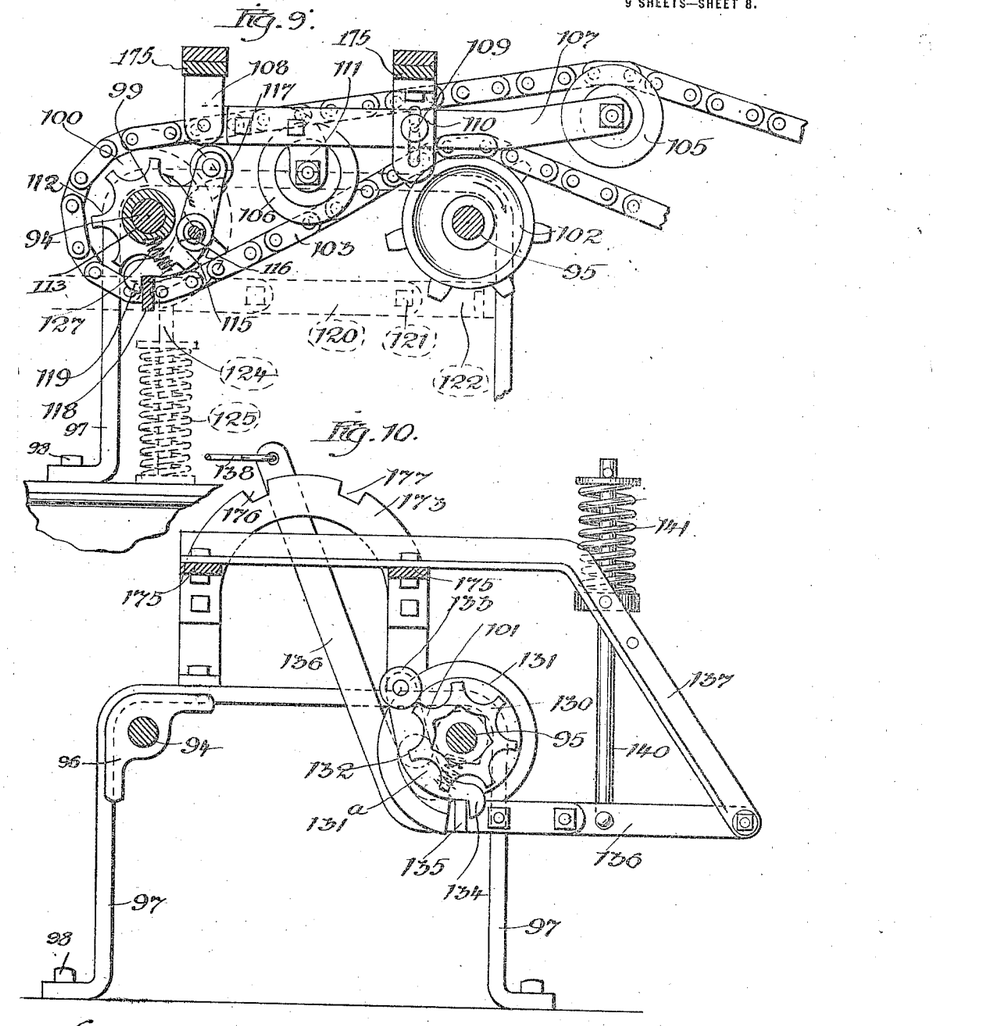
Fig. 9 is a section taken on line 9—9 of Fig. 6.
Fig. 10 is a section taken on line 10—10 of Fig. 6.

Clutch 99, whereby shaft 94 is operated, comprises a star-wheel 112 which is integral with sprocket-wheel 100 and serves as a constantly rotating member of clutch 99, both the sprocket and star-wheel being loose on shaft 94. A clutch-member 113 is secured to shaft 94 by a key 114 and a clutch-dog 115 is pivoted to clutch-member 113, as at 116, and carries a roller 117 which is adapted to pass into the notches of star-wheel 112 to cause clutch-member 113 and shaft 94 to be driven. A spring 127 is applied to dog 115 to press it normally into position to be driven by star-wheel 112 and an abutment 118 is adapted to be moved into and out of the path of a lug 119 on the tail of dog 115, to withdraw and hold said dog out of operative relation with star-wheel 112. To provide against back-lash of clutch-member 113, it is provided with a notch 119$^a$ into which abutment 118 is adapted to pass when this clutch member reaches its normal position of rest. Abutment 118 is secured on a lever 120 which is pivoted, as at 121 to a lug 122, which is secured to one of the legs of one of the brackets 97. This lever extends forwardly from its pivot and thence upwardly and forwardly, so that the lever may be conveniently operated to withdraw abutment 118 from engagement with clutch-dog 115 and member 113, by means of a cord or wire 123 extending from the upper end of said lever to the tractor. By this means, the operator on the tractor, by pulling cord or wire 123, will control clutch 99 to cause it to operate shaft 94 which will operate the plow-connections to raise the plows whenever desired. Lever 120 is normally held in position to press abutment 118 into operati relation with clutch-member 113, by a rod 124 and spring 125. As a result, when the operator pulls wire 123, the clutch will become operative and commence to rotate clutch-member 113 and shaft 94. After such commencement, the operator may release the cord or wire 123 and abutment 118 will ride on a flange or rim 113$^a$ on member 113 until the clutch has made one complete revolution, whereupon, abutment 118 will automatically arrest dog 115 and clutch-member 113, passing into notch 119$^a$ and locking said member and shaft 94 against further movement.

A similar clutch and automatic throw-out is provided to drive shaft 95 which is driven in the opposite direction to that in which shaft 94 is driven. This mechanism comprises a star-wheel 130 integral with sprocket 102, so that it will be continually driven by chain 103, a clutch-member 131 keyed to shaft 95 and carrying a dog 131$^a$ which is pivoted thereto, as at 132, and carries a roller 133 adapted to pass into driving-relation with star-wheel 130, and a tail or lug 134 adapted to be operated by an abutment 135 on a controlling-lever 136. Dog 131ᵃ is normally spring-pressed into driving relation with the star-wheel, in manner similar to dog 115, and is adapted to operate clutch-member 131 in manner similar to said dog, under control of a lever 136. Clutch-member 131 is provided with a flange and notch, similar to clutch-member 113, to hold abutment 135 out of operative relation with dog 131 until shaft 95 has completed one revolution and then lock the shaft against rotation until lever 136 is again operated. Lever 136 has its rear end pivoted to a supporting-bar 137 which is secured to the frame and this lever extends upwardly and forwardly from abutment 135 into position for connection to a cable or wire 138, which leads to the tractor, so that by pulling the cable or wire, lever 136 will be operated to release dog 131ᵃ and cause one complete revolution of shaft 95 and the plow-connections, to cause the plows to be forced into the ground. Lever 136 is normally held in operative relation to clutch-member 131 by a rod 140 and spring 141, which cause the lever to be yieldingly held in raised position. When it is desired to cause shaft 95 to be operated to lower the plows, the operator will pull wire 138 to cause lever 136 and abutment 135 to release dog 131ᵃ, whereupon, the clutch will remain operative to drive shaft 95 one complete revolution, and thereupon, abutment 135 will disengage dog 131ᵃ from star-wheel 130 and lock shaft 95 against further revolution.

This mechanism for operating the plow-connections to raise and lower the plows, respectively, exemplifies automatically operating devices whereby the shafts under control of the operator will serve to operate the plow-connections and will then be automatically disconnected after each operation, so that it is only necessary for the operator to manipulate a cord or wire for each plow-shifting operation.

A separate connection is provided for operating each of the plow-carrying frames or gangs of the plows. Each of these plow-connections comprises a lever 144 which is pivoted by a bolt 145 to a lug 146, which is secured to one of the brackets 97 and a bell-crank lever 147, which is pivoted at 148 to a sleeve 149 on a standard 150 which is supported by a trail-wheel 151. Lever 147 is pivoted to the plow-beam at 152 and a link 153, parallel to the arm of bell-crank lever 147 between pivots 152 and 148, and also connects the plow-beam to sleeve 149 to sustain standard 150 and sleeve 149. Bolt 152, which connects bell-crank lever 147 to the plow-beam, is carried in brackets 156 and 157 which are bolted to the bars 54. A U-shaped bracket 158 is bolted to brackets 156 and 157 and is secured to beam-bars 54 by bolts 159. The angular end 153ᵃ of link 153 extends through both arms of bracket 158 to form a firm pivotal connection between said link and the plow-beam. A brace 152ᵃ connects bolt 152 and brace-bar 64.

Figure 4:
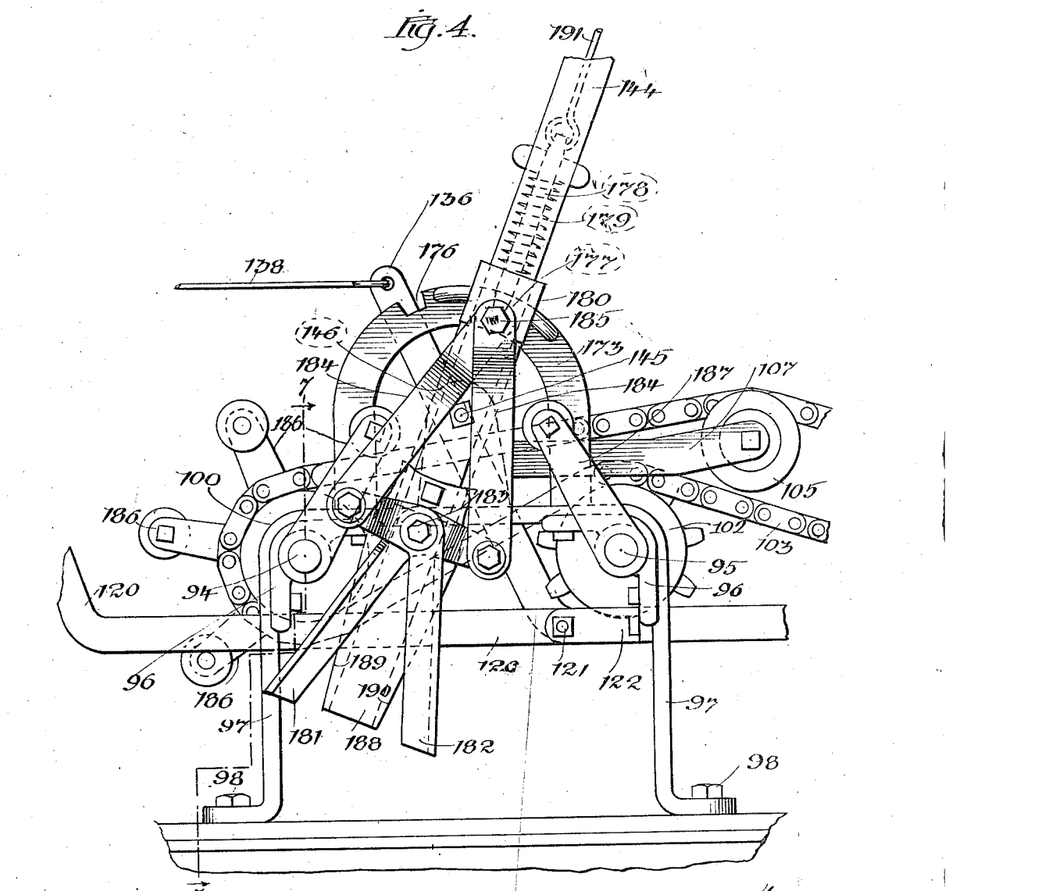
Fig. 4 is a side elevation of one of the plow-shifting levers and the devices for locking and operating same.
Figure 5:
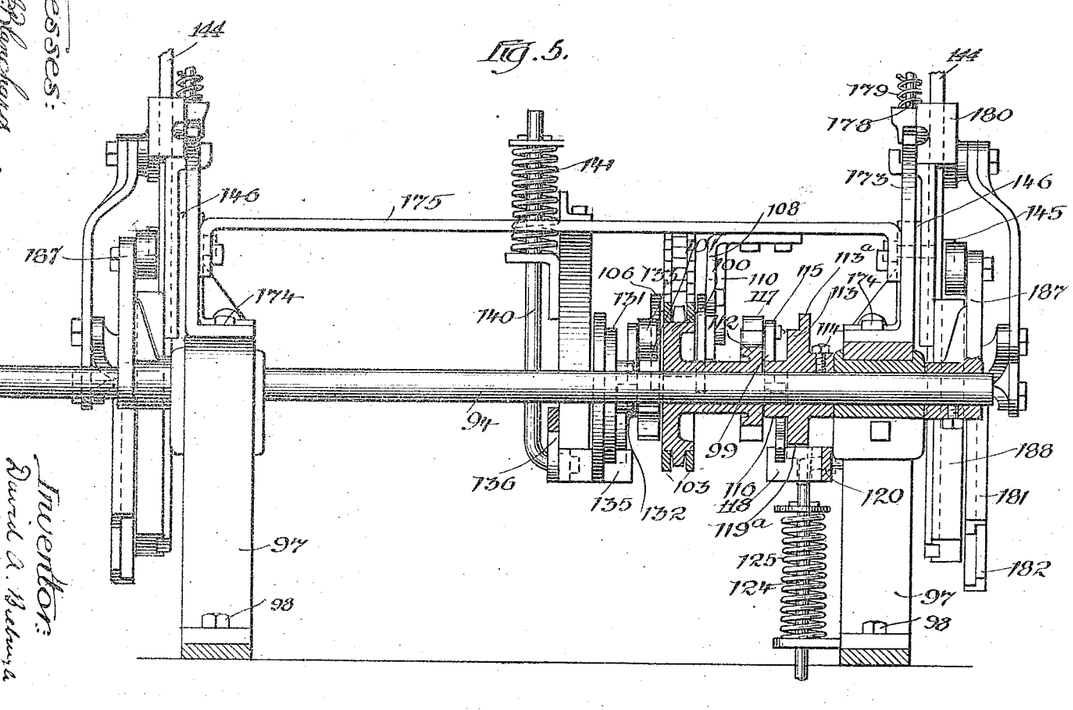
Fig. 5 is a section taken on line 5—5 of Fig. 4.

Each plow-operating connection comprises a linkage between its lever 144 and bell-crank lever 147, which consists of a link 160 which is pivoted to lever 144 at 161, a link 162 which is pivoted to bell-crank lever 147 at 163, a short vertical link 164 extending between and pivoted to links 160, 162, and a lever 165 which is pivoted at 166 to link 162 and to link 160 at 167. A rack 168 is bolted to link 160 and a lever-lock 169 is adapted to engage said rack to lock the lever in its different positions. By adjusting the lever 165 the length of the linkage between lever 144 and bell-crank lever 147 may be varied to cause the plows to assume a lower or higher position in the soil, as desired. That is to say, by adjustment of this linkage, each gang may be adjusted in this manner relatively to the other gangs, and therefore, this linkage exemplifies an adjustable connection between the plow-beam and the operating-lever, whereby the length of the linkage may be readily varied when desired, so that each gang may be adjusted independently of the others, according to the depth in which it is desired that each gang shall work. These linkages permit the plows to be raised in passing over bumps, without unlocking levers 144.

A locking segment 173 is fixedly secured to bracket 97 by bolts 174, and bars 175 extend between pairs of brackets 97 to rigidly secure them and locking segments 173 transversely. Each segment 173 is provided with a notch 176 for locking the locking-lever 144 in position to hold the plows raised, and a notch 177 for holding the lever in position to lock the plow-connections to hold the plows in the ground. A lock-bolt 178 is normally pressed into position to engage the rack 173 by a spring 179 and is adapted to pass into notches 176, 177. The bolt-carrying frame 180 is slidably mounted on lever 144 and is adapted to be operated to release lever 144 by either of a pair of oppositely disposed levers 181 and 182, which are connected to lever 144 by a common pivot-bolt 183, and each lever 181, 182 has an arm which is connected by a link 184 to the bolt-carrying frame 180, as at 185. Arms 181 and 182 have their outer edges disposed to be engaged, respectively, by arms 186 and 187 on the intermittently operated clutch-shafts 94 and 95, respectively. Each lever 144 has secured to its lower end, a plate 188 which has its edges 189 and 190, formed to be engaged by rollers on arms 186 and 187, respectively, so that during a revolution of either of the shafts 94 and 95, the lever will be shifted from one of its alternative positions to the other. When lever 144 is in position assumed, when the plows are in the ground, and controller-lever 120 has been operated to cause clutch 99 to operate shaft 94 one revolution, an arm 186 on said shaft will initially strike levers 181 and disengage bolt 178 from segment 173 to release lever 144 and then the roller on said arm will act upon edge 189 of plate 188 and will shift lever 144 about its fulcrum 145 until said lever has been shifted into position to cause bolt 178 to spring into notch 176 of segment 173 at which time the lever will be locked in position to hold the plow in raised position. When it is desired to lower the plows, controlling lever 136 will be operated to cause shaft 95 to be driven one revolution by clutch 101 thereon, and thereupon arm 187 on said shaft will initially operate lever 182 and one link 184 to release bolt 178 and lever 144, and the roller on said arm will engage edge 190 of plate 188 on lever 144 and shift the latter lever until the bolt is locked in notch 177 in segment 175, when the plow-connections will have been operated to force the plows into the ground. A finger-lever 192 is connected to bolt 178 by a rod 191 so that lever 144 may be released for manual shift when desired.

An arm 186 is provided on clutch-shaft 94 for each lever 144 and these arms are relatively offset and adjustable on shaft 94 so that they will operate in succession, the foremost gang first, to cause the plows to be lifted out of the ground at the same point at right angles to the machine during one revolution of shaft 94, and so that the plows, which are in trailing order, are raised by the power-operated mechanism successively to leave the ground on a line crosswise of the line of draft.

An arm 187 is secured on clutch-shaft 95 for each lever 144 and these arms are also relatively offset to operate the levers successively in lowering the plows into the ground, so that the foremost plow will be lowered first, and the remaining plows in succession, so that they will enter the ground at the same line at right angles to the line of draft.

By disconnecting the link 160, from lever 144, at pivot 161, and removing pivot-pin 52 at the front of each gang of plows, any of the gangs desired may be disconnected from the machine, so that the plow may be operated with less gangs, if desired.

This power-operated lifting and lowering mechanism thus exemplifies a lever and connections whereby the plows will be operated by power taken from the traction-wheel of the plow and in which the plows will be successively raised or lowered to cause them to commence plowing or cease plowing on a line at right angles to the line of draft, and also exemplifies clutches for operating the raising and lowering mechanism, which are automatically locked after the desired movement or one revolution has been imparted to the shafts for operating all of the independent plow-operating connections.

The invention is not to be understood as restricted to the details set forth, since these may be modified by the skilled mechanic within the scope of the appended claims without departing from the spirit and scope of the invention.

Having thus described the invention, what I claim as new and desire to secure by Letters Patent, is:

1. In a plow, the combination of a frame, carrying-wheels, a plow-carrying structure pivotally connected to the frame, a lever, draft-operated mechanism for operating said lever, and a connection for operating the structure from said lever comprising a linkage and a lever for shortening and lengthening the linkage to adjust the plow, said lever being sustained by said linkage.

2. In a plow, the combination of a frame, carrying-wheels, a plow-carrying structure pivotally connected to the frame, a lever, draft-operated mechanism for operating said lever, and a connection for operating the plow from said lever, comprising a pair of links pivoted to the lever and to the plow-structure respectively, a link and a lever between said links and means for locking the lever.

3. In a plow, the combination of a frame, carrying-wheels, a plow-carrying structure pivotally connected to the frame, a lever, draft-operated mechanism for operating said lever, a connection for operating the plow from said lever comprising a pair of links connected to the lever and the plow-structure respectively, a cross-link between said links, a lever pivoted to said pair of links, a rack secured to one of said links and a lock on the lever.

4. In a tractor plow, the combination of a frame, carrying-wheels, a series of plow-carrying structures pivoted to the frame, connections for shifting the structures respectively, each comprising a lever connected to the structure, a lever mounted on the frame and a link-connection between said levers and power-driven means for operating the connections to forcibly shift them in lowering the plows.

5. In a tractor plow, the combination of a frame, carrying-wheels, a series of plow-carrying structures pivoted to the frame, connections for shifting the structures, respectively, each comprising a lever connected to the structure, a lever mounted on the frame and a link-connection between said levers and power driven means for operating the connections to successively force them in lowering the plows.

6. In a tractor plow, the combination of a frame, carrying-wheels, a series of plow-carrying structures pivoted to the frame, a gage-wheel for each structure, connections for shifting each of the structures, each comprising a lever connected to the structure and to the gage-wheel, a lever mounted on the frame and a link between said levers, and power-driven mechanism for shifting the connections to lower the plows.

7. In a tractor plow, the combination of a frame, carrying-wheels, a series of plow-carrying structures pivoted to the frame, a gage-wheel for each structure, connections for shifting each of the structures, each comprising a lever connected to the structure and to the gage-wheel, a lever mounted on the frame and a link between said levers and power-driven mechanism for successively shifting the connections to lower the plows.

8. In a plow, the combination of a frame, carrying-wheels, plows, plow-carrying structures pivotally connected to the frame, levers and connections for operating said structures respectively, a shaft, means on said shaft for operating the levers to raise the structures, another shaft, and means on the latter shaft for operating the levers to forcibly shift them in lowering the plows.

9. In a plow, the combination of a frame, carrying-wheels, plows, plow-carrying structures pivotally connected to the frame, levers and adjustable connections for operating said structures respectively, a shaft, means on said shaft for operating the levers to raise the structures, another shaft, and means on the latter shaft for operating the levers to forcibly shift them in lowering the plows.

10. In a plow, the combination of a frame, carrying-wheels, plow-carrying structures pivotally connected to the frame, levers and connections for operating said structures respectively, a shaft, means on said shaft for successively operating the levers to raise the structures, another shaft, and means on the latter shaft for successively operating the levers to forcibly shift them in lowering the plows.

11. In a plow, the combination of a frame, carrying-wheels, plows, plow-carrying structures pivotally connected to the frame, levers and connections for operating said structures respectively, a shaft, means on said shaft for operating the levers in one direction to raise the plows, another shaft, means on the latter shaft for operating the levers in the opposite direction, clutches on said shafts respectively, automatic throw-outs for said clutches, a chain for operating both of said clutches, and controlling means for the clutches.

12. In a plow, the combination of a frame, carrying-wheels, plows, plow-carrying-structures pivoted to the frame, connections for shifting said structures, each connection comprising a linkage and a lever for adjusting the linkage and sustained thereby, and power-driven mechanism for operating the connections.

13. In a plow, the combination of a frame, carrying-wheels, plow-carrying structures pivoted to the frame, connections for shifting said structures, each connection comprising a linkage and a lever for adjusting the linkage and sustained thereby, and power-driven mechanism for operating the connections in both directions.

14. In a plow, the combination of a frame, carrying-wheels, plows, plow-carrying structures pivoted to the frame, a lever for each structure, connections for operating said structures from the levers, and power-driven mechanism for operating said levers, comprising rotating elements at opposite sides of the lever, for positively shifting the levers in opposite directions respectively.

15. In a plow, the combination of a frame, carrying-wheels, plow-carrying structures pivoted to the frame, a lever for each structure, connections for operating said structures from the levers, locking-devices for the levers, respectively, power-driven mechanism for operating the levers to shift said connections, and power-operated releasing means for said locks, each releasing-means comprising a releasing lever pivoted to the operating lever and connected to the lock.

16. In a plow, the combination of a frame, carrying-wheels, plow-carrying structures pivoted to the frame, a lever for each structure, connections for operating said structures from the levers, locking-devices for the levers, respectively, power-driven mechanism for operating the levers to shift said connections, releasing-means for said locks, each releasing-means comprising a releasing lever pivoted to the operating lever and connected to the lock, and operated by said power-driven mechanism.

DAVID A. BIEBINGER.

Witnesses:
F. E. DAVIS,
C. F. SUTOR.